Figure 1:
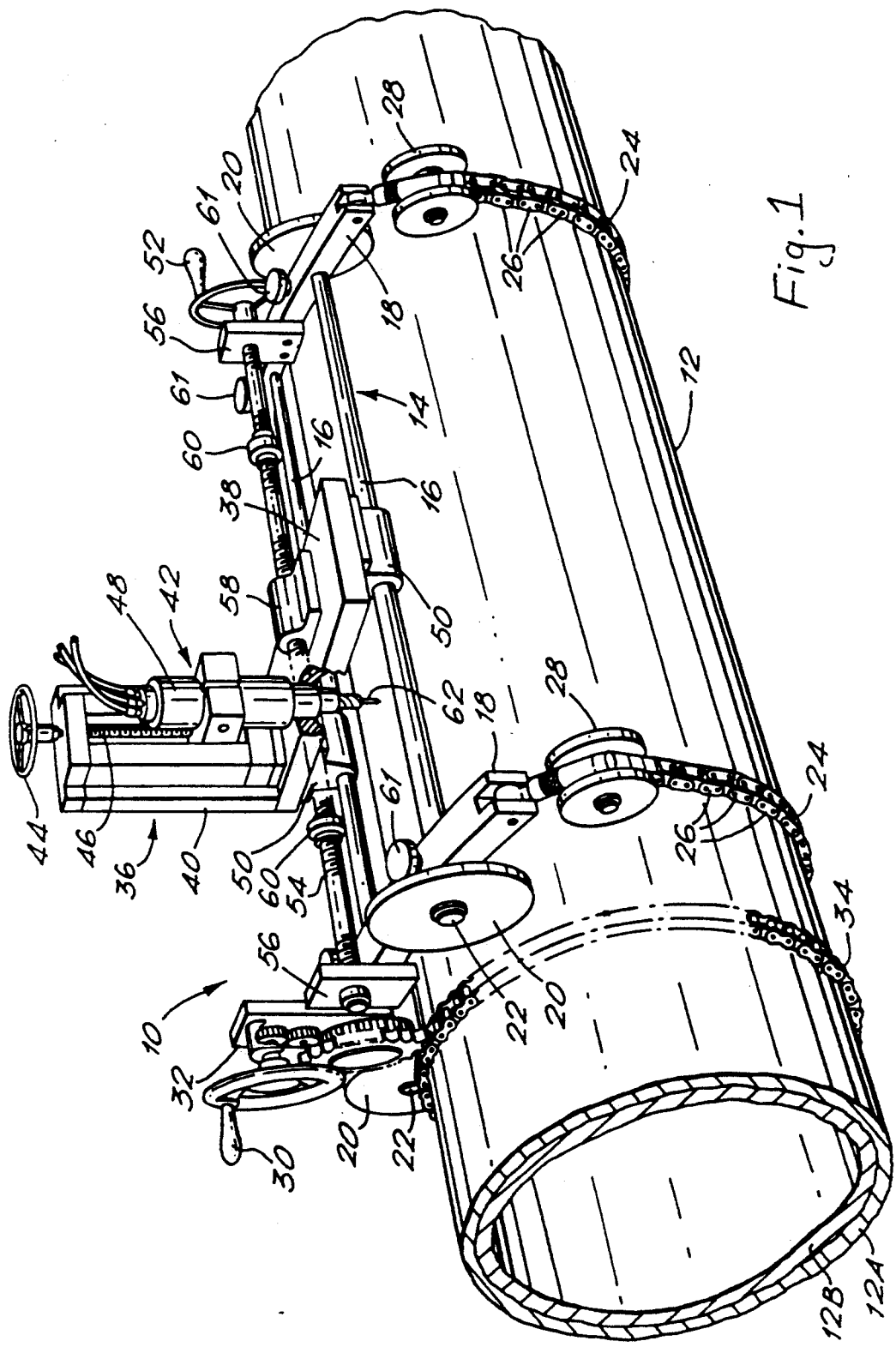

United States Patent [19]

McGuire

[11] Patent Number: 5,159,756
[45] Date of Patent: Nov. 3, 1992

[54] METHOD OF AND APPARATUS FOR CUTTING A PIPE

[75] Inventor: Brian E. McGuire, Oldham, United Kingdom

[73] Assignee: British Gas plc, London, England

[21] Appl. No.: 606,920

[22] Filed: Oct. 31, 1990

[30] Foreign Application Priority Data

Nov. 7, 1989 [GB] United Kingdom ............... 8925104

[51] Int. Cl.⁵ .............................................. B23D 21/00
[52] U.S. Cl. ............................................ 30/92; 30/96
[58] Field of Search ............................... 30/92, 96–98, 30/294, 289; 83/745

[56] References Cited

U.S. PATENT DOCUMENTS

| | | |
|---|---|---|
| 4,185,525 | 1/1980 | Sherer . |
| 4,359,820 | 11/1982 | Wheeler . |
| 4,411,410 | 10/1983 | Sumner. . |
| 4,440,383 | 4/1984 | Dearman . |
| 4,490,909 | 1/1985 | Wachs . |
| 4,682,919 | 7/1987 | Mitchell . |
| 5,009,007 | 4/1991 | Martin et al. ............... 30/92 |

FOREIGN PATENT DOCUMENTS

| | | |
|---|---|---|
| 3120009 | 9/1982 | Fed. Rep. of Germany . |
| 3151641 | 7/1983 | Fed. Rep. of Germany . |
| 1075669 | 7/1967 | United Kingdom . |

OTHER PUBLICATIONS

"Tool cuts a pipe window", On the Market, p. 25, Apr. 1988, Gas World, Reader Service No. 349.
"Axial Pipe Window Cutter for Steel Pipe without Damage to Inserted Plastic", Operating Section Proceedings 1971, American Gas Association, C. J. Rees, pp. D-121-D-123.

*Primary Examiner*—Douglas D. Watts
*Attorney, Agent, or Firm*—Oblon, Spivak, McClelland, Maier & Neustadt

[57] ABSTRACT

Cutting apparatus is provided for cutting a hole or 'window' in the wall of a pipe, for example prior to joining a branch pipe to a host pipe. The apparatus comprises a chassis frame 14 carrying a cutter unit 42 supporting a cutter tool 62. The chassis is attached to and movable around the pipe 12 by means of 'roller' chains 24. The cutter unit is movable with respect to the chassis frame by means of the associated slider block 38 which is slidable along longitudinally extending chassis frame members 16. Thus, the cutter tool 62 can be moved relative to the workpiece in one sense by movement of the chassis frame 14 and in another sense by movement of the cutter tool relative to the chassis frame. A combination of such movements enable the hole or 'window' to be cut.

4 Claims, 1 Drawing Sheet

METHOD OF AND APPARATUS FOR CUTTING A PIPE

This invention relates to cutting apparatus, more particularly, though not exclusively, to a cutting apparatus for cutting a workpiece in the form of a pipe or a tube. The invention also relates to a method for cutting a workpiece such as a pipe or a tube, and to a method of joining a pipe to a host pipe.

It is often necessary to cut a hole or a 1 window' in the wall of a pipe or a tube, for instance when joining a branch pipe to a host pipe to form a T junction. In most cases it is desirable to cut the window as accurately as possible, both in terms of depth of cut and line of cut. For example, pipes of cast iron or other metal are often lined with a plastics liner and, when connecting a branch pipe to the host pipe, it is conventional to seal the branch pipe to the plastics liner. It is, therefore, desirable to cut out a window from the metal outer wall without penetrating or without significantly cutting into the plastics liner, thereby exposing an area of the outer surface of the plastics liner to which the branch pipe can be connected in a subsequent operation. It will be appreciated that precise control over the depth of cut can be particularly important, so as to ensure that the metal outer wall is substantially fully penetrated without or without significantly cutting into the plastics liner.

Unfortunately, accuracy has been found to be difficult to achieve in practice for a number of reasons. For example, the curved outer surface of the pipe makes it difficult to establish, and to maintain, a reference surface against which cutter movement can be measured. Another difficulty arises from the location of the pipe itself; it is usual for pipes to be worked on in situ and access to the pipe may well be restricted, particularly where the pipe is underground such as in a gas main or a water main system.

In accordance with one aspect of this invention, a cutting apparatus comprises a chassis carrying a cutting tool for movement relative to a workpiece, and attachment means arranged to attach the chassis to the workpiece.

In a preferred embodiment of the invention, the attachment means is arranged to allow movement of the chassis relative to the workpiece in use. It is also preferred that the cutting tool is movable relative to the chassis. Thus, the cutting tool can, in its cutting position, be moved relative to the workpiece in one sense by movement of the chassis relative to the workpiece, and in another sense by movement of the cutting tool relative to the chassis. For example the cutting tool may be movable in transverse directions, selectively, to effect cutting of the workpiece. Where the workpiece is a pipe or tube, the cutting tool may be movable both circumferentially about and longitudinally of, the pipe, selectively.

The attachment means is suitably adapted to embrace a workpiece such as a pipe and preferably comprises one or more chains. In order to reduce friction where the chassis is movable relative to the workpiece, the chain or chains may be provided with rollers and the chassis can be fitted with wheels.

Traction means may be provided to facilitate accurate movement and positioning of the chassis relative to the workpiece. The traction means suitably comprises a chain for attachment to the workpiece, which engages with sprocket means mounted on the chassis. The sprocket means may be driven via, for example, a gear train or worm wheel. The chassis may be provided with securing means for preventing movement of the chassis relative to the workpiece during cutting of the workpiece by movement of the cutting tool relative to the chassis. Such securing means may comprise one or more clamps or set screws which can be tightened against the surface of the workpiece.

The present invention also includes a method of joining a pipe to a host pipe comprising an outer layer of material and an inner lining, said method comprising cutting out and removing a portion of the outer layer to provide a window therein to expose an area of the lining, producing an opening in the exposed area of the lining and joining the pipe to the exposed lining to form a branch pipe which communicates with the interior of the host pipe via the opening.

In order that this invention may be more readily understood, reference will now be made, by way of example only, to the accompanying drawing. This drawing, FIG. 1, is a schematic perspective view showing a preferred embodiment of the invention in use, mounted upon a pipe.

In FIG. 1, a cutting apparatus 10 is shown mounted upon a pipe 12. The pipe 12 has a metallic outer layer 12a, for example of cast iron, and a plastics inner lining 12b.

The cutting apparatus 10 comprises a chassis frame 14, which is formed from two parallel longitudinal tubular members 16 connected at their respective ends by transverse curved end beams 18. Each end beam 18 carries a pair of wheels 20 on its outer side. The wheels 20 rest upon the pipe 12 and therefore support the chassis frame 14 at a fixed distance from the outer surface of the pipe 12.

The wheels 20 are mounted for rotation upon respective longitudinal axles 22, which are suitably aligned with the tubular members 16 as shown. Thus, the wheels 20 allow the chassis frame 14 to move circumferentially with respect to the pipe 12 whilst keeping the chassis frame 14 at a fixed distance from the pipe 12. Conversely, the wheels 20 resist longitudinal movement of the chassis frame 14 with respect to the pipe 12.

Each end beam 18 co-operates with a respective attachment chain 24 to encircle the pipe 12, the ends of each attachment chain 24 being connected to respective ends of each beam 18. At least one end of each attachment chain 24 is detachable from the associated end beam 18 to allow the chassis frame 14 to be mounted upon, or dismounted from, the pipe 12.

The attachment chains 24 are tightened in use about the pipe 12, thereby keeping the wheels 20 in close contact with the outer surface of the pipe 12. A series of rollers 26 and a set of wheels 28 carried by each chain 24 eases circumferential movement of each chain 24 about the pipe 12, by reducing friction.

Circumferential movement of the chassis frame 14 about the pipe 12 is controlled by a hand-operated, gear train driven sprocket wheel 30, which is carried by a bracker 32 provided upon the end beam 18 shown towards the left side of FIG. 1. The sprocket wheel 30 engages with a traction chain 34, which encircles and tightly grips the pipe 12 at a position outboard of the attachment chains 24.

A cutter assembly generally indicated by reference numeral 36 comprises a slider block 38 which carries a slider assembly 40. The slider assembly 40 in turn carries a cutter unit 42 for radial movement relative to the pipe 12 under control of a handwheel 44 and screw 46. The cutter unit 42 is preferably powered by an hydraulic motor 48. Adjustable stop means may be provided to limit the depth of cut to any desired value.

The cutter assembly 36 is supported by the chassis frame 14 for longitudinal movement relative to the pipe 12. To this end, the underside of the slider block 38 is provided with sleeves 50 which receive, and which (together with the slider block 38) are slidable along, the respective tubular members 16.

Longitudinal movement of the cutter assembly 36 is controlled by a handwheel 52 and screw 54. The screw 54 is parallel to the tubular members 16 and is supported at each end by bearing brackets 56 provided upon each end beam 18.

The screw 54 is threadedly engaged within block 58 attached to the upper side of the slider block 38. Adjustable stops 60 are provided upon the screw 54 to limit the range of longitudinal movement, the limits being determined by abutment of the stops 60 with the block 58.

In order to prevent circumferential movement of the chassis frame 14 about the pipe 12 during longitudinal cutting, clamps or set screws 61 are provided on both of the end beams 18. The clamps or set screws 61 can be tightened down onto the pipe surface so as to clamp the chassis frame 14 in a fixed position with respect to the pipe 12.

In use, the cutting apparatus 10 is mounted upon the pipe 12 as described and the attachment chains 24 ar secured to the end beams 18. The traction chain 34 is also secured to the pipe 12 in a position suitable to engage with the sprocket wheel 30. The chains 24 and 34 are then tightened. The cutter unit 42 is then activated and adjusted in height above the pipe so that the cutter tool 62, which is in the form of a milling cutter, is brought into contact with the surface of the pipe 12 by use of the handwheel 44 to start cutting a window at a desired location on the pipe. Once the cutter tool 62 has reached a depth sufficient to cut through the outer metallic layer 12a of the pipe 12, the depth of cut of the cutter tool is set and without or without significantly cutting into the plastics lining the cutter unit 42 is moved longitudinally and circumferentially by means of the handwheels 52 and 30 respectively until a complete window has been cut. The cutting apparatus 10 can then be dismounted from the pipe 12 so that the window can be removed to expose the plastics lining 12b. The plastics lining 12b can be pierced at a later stage to provide an opening, and a plastics pipe joined to the plastics lining 12b at the exposed region to form a branch pipe which communicates with the interior of the pipe 12 via the opening (not shown).

When circumferential cuts are made by the cutter tool 62 the cutter assembly 36 may be locked or secured in its position longitudinally of the pipe by, for example, screwing the stops 60 into abutment with respective opposite sides of the block 58.

As will be clear to those skilled in the art, the apparatus as described above uses a single cutting tool to effect cuts in transverse directions, selectively, and provides a reliable, efficient and precise means of cutting a window in pipe. The apparatus of the invention gives particularly benefits where the depth of cut is important.

It will also be appreciated that the above described method and apparatus may be used on host pipes made of other materials and on pipes which are not lined, in order to cut holes or 'windows' therein.

I claim:

1. Apparatus for cutting a window in a pipe comprising:

a chassis having: guide means for extending longitudinally of the pipe; a cutter assembly comprising a cutter unit provided with a milling cutting tool, the cutter assembly being movably mounted on the guide means; control means for accurately controlling the positioning and movement of the cutter assembly along the guide means; and means for accurately controlling the positioning and movement of the cutter unit in directions transverse to the directions of movement of the cutter assembly along the guide means and, in use, towards and away from the pipe, the cutting tool being capable of effecting cuts in the pipe wall in transverse directions;

attachment means adapted to embrace the pipe to attach the chassis to the pipe and to enable the chassis to be moved relative to the pipe in directions transverse to the directions of movement of the cutter assembly along the guide means and circumferentially of the pipe when the apparatus is in use; and traction means associated with the chassis to facilitate accurately controlling the positioning and movement of the chassis relative to the pipe.

2. Apparatus as claimed in claim 1, wherein the attachment means comprises one or more chains provided with rollers for engaging the surface of the pipe wall to facilitate movement of the chassis around the pipe.

3. Apparatus as claimed in claim 2, wherein the chassis is fitted with wheels to engage the surface of the pipe wall to facilitate movement of the chassis around the pipe.

4. Apparatus as claimed in claim 1, wherein the traction means comprises a chain, for attachment to the pipe, and sprocket means mounted on the chassis for engagement with the chain.

* * * * *